(12) United States Patent
Morgan et al.

(10) Patent No.: US 8,517,663 B2
(45) Date of Patent: Aug. 27, 2013

(54) METHOD AND APPARATUS FOR GAS TURBINE ENGINE TEMPERATURE MANAGEMENT

(75) Inventors: Rex Allen Morgan, Simpsonville, SC (US); Michael Alan Davi, Niskayuna, NY (US); Clement Gazzillo, Schenectady, NY (US); Harold Lamar Jordan, Jr., Greenville, SC (US)

(73) Assignee: General Electric Company, Schenectady, NY (US)

( * ) Notice: Subject to any disclaimer, the term of this patent is extended or adjusted under 35 U.S.C. 154(b) by 1366 days.

(21) Appl. No.: 12/241,165

(22) Filed: Sep. 30, 2008

(65) Prior Publication Data

US 2010/0080685 A1 Apr. 1, 2010

(51) Int. Cl.
*F02C 7/18* (2006.01)

(52) U.S. Cl.
USPC ............ 415/47; 415/17; 415/115; 415/116; 415/180; 60/806; 416/1; 416/36; 416/39; 416/95; 416/96 R; 416/97 R

(58) Field of Classification Search
USPC ............ 416/17, 47, 116, 180, 1, 36, 39, 95, 416/96 R, 97 R; 60/806; 415/17, 47, 116, 415/180, 14, 115

See application file for complete search history.

(56) References Cited

U.S. PATENT DOCUMENTS

| | | | | |
|---|---|---|---|---|
| 3,575,528 | A | * | 4/1971 | Beam et al. .................... 416/39 |
| 4,069,662 | A | * | 1/1978 | Redinger et al. ............. 60/226.1 |
| 4,217,755 | A | * | 8/1980 | Williams ........................ 60/806 |
| 5,048,288 | A | * | 9/1991 | Bessette et al. ............. 60/226.1 |
| 6,067,791 | A | | 5/2000 | Patel |
| 7,445,424 | B1 | | 11/2008 | Ebert et al. |
| 2007/0137213 | A1 | * | 6/2007 | Rickert et al. ................... 60/782 |
| 2008/0050218 | A1 | * | 2/2008 | Sokhey ........................ 415/119 |

* cited by examiner

*Primary Examiner* — Matthew W Such
*Assistant Examiner* — David Spalla
(74) *Attorney, Agent, or Firm* — Cantor Colburn LLP

(57) ABSTRACT

A cooling system for a turbine engine, as well as a methodology for controlling the cooling system, is described. A valve member is disposed between a cooling fluid passage and a wheel space of the turbine engine and operates to admit cooling fluid to the wheel space for cooling thereof. The valve assembly is responsive to a condition in the wheel space and varies the flow of additional cooling fluid to the wheel space based on that condition.

10 Claims, 3 Drawing Sheets

METHOD AND APPARATUS FOR GAS TURBINE ENGINE TEMPERATURE MANAGEMENT

BACKGROUND OF THE INVENTION

The subject matter disclosed herein relates to gas turbine engines, and, more particularly, to temperature management therein.

In a gas turbine engine, air is pressurized in a compressor and mixed with fuel in a combustor for generating hot combustion gas that flows downstream through multiple turbine stages. A turbine stage includes a stationary turbine nozzle having stator vanes that guide the combustion gas through a downstream row of turbine rotor blades extending radially outwardly from a supporting disk, which is powered by extracting energy from the hot combustion gas.

A first stage turbine nozzle receives hot combustion gas from the combustor, which is subsequently directed to the first stage turbine rotor blades, for extraction of energy therefrom. A second stage turbine nozzle may be disposed downstream of the first stage turbine rotor blades, and is followed in turn by a row of second stage turbine rotor blades, for extraction of additional energy from the combustion gas. Similarly, a third stage turbine nozzle may be disposed downstream of the second stage turbine rotor blades, and is followed in turn by a row of third stage turbine rotor blades.

As energy is extracted from the hot combustion gas, the temperature of the gas is correspondingly reduced. However, since the gas temperature is relatively high, the turbine stages are typically cooled by delivery of a coolant, such as compressed air which may be diverted from the compressor. Since the diverted cooling air is unavailable to the combustor, the overall efficiency of the engine is correspondingly reduced. It is therefore desired to improve the use of such cooling air for improving the overall efficiency of the engine.

The quantity of cooling air required is dependant on the temperature of the combustion gas, material selection and turbine engine design. That temperature varies from idle operation of the turbine engine to high power operation, and from low to high temperatures at the compressor inlet. For example, in a land-based gas turbine engine that powers an electrical generator, high temperature operating conditions typically occur during the hot day, peak power condition. Combustion gas temperature may therefore vary temporally over the operating or running conditions of the engine. Since combustion gas temperature directly affects the durability of the vanes and blades, the cooling air requirement for the turbine stages must be effective for withstanding high combustion gas temperature operation of the engine, although that running condition may only occur for a relatively short time during engine operation.

A wheel space is defined between the first stage nozzle assembly and the compressor exit diffuser. Due to its proximate location to the outlet of the combustor, the wheel space is subject to some of the higher temperatures experienced by the turbine. To maintain the wheel space within a temperature range which is suitable for the long term durability of the components in that region, cooling air is delivered to the wheel space. Under certain operating conditions, such as high ambient temperatures resulting in high temperatures at the inlet of the compressor, the volume of cooling air may be insufficient to maintain the wheel space within a desired temperature range. In such situations it is known to disassemble the turbine engine and remove plugs from the combustor inlet housing. This results in diversion of a portion of the high pressure air exiting the compressor to the wheel space through the openings formerly closed by the plugs. While the result is supplemental cooling of the wheel space region of the turbine, the modification is permanent. As such, cooling air is delivered to the wheel space when it may not be required, thereby lowering the overall performance of the turbine engine.

It is therefore desired to provide a gas turbine engine having improved cooling.

BRIEF DESCRIPTION OF THE INVENTION

An exemplary embodiment of the invention is included in a cooling system for a turbine engine, as well as a methodology for controlling the cooling system thereof A valve member is disposed between a cooling fluid passage and a wheel space of the turbine engine. The valve assembly is responsive to a condition in the wheel space and varies the flow of cooling fluid to the wheel space based on that condition.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
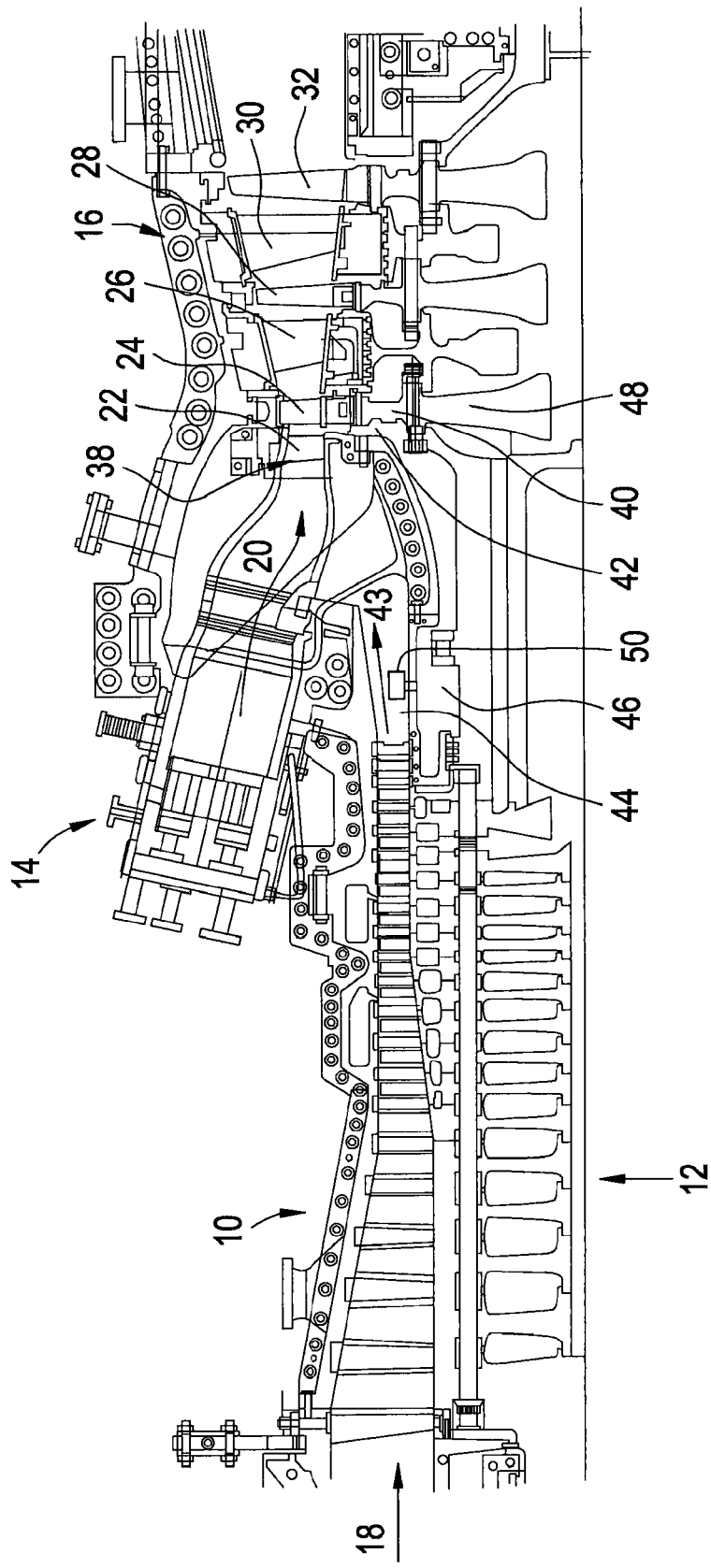
FIG. 1 is an axial sectional view through a portion of a gas turbine engine in accordance with an exemplary embodiment of the invention.

Illustrated in FIG. 1 is a portion of a gas turbine engine 10. The gas turbine engine 10 is axisymmetrical about a longitudinal or axial center line axis and includes, in serial flow communication, a multistage axial compressor 12, a combustor 14, and a multi-stage turbine 16. During operation, air 18 is pressurized in the compressor 12 and is mixed with fuel in the combustor 14 to generate hot combustion gas 20. The combustion gas flows downstream through the multi-stage turbine 16 which extracts energy therefrom.

As shown in FIG. 1, one embodiment of a multi-stage turbine 16 may be configured in three stages having six rows of airfoils 22, 24, 26, 28, 30, 32 disposed axially in direct sequence with each other for channeling the hot combustion gas 20 therethrough, and extracting energy therefrom. The airfoils 22 are configured as first stage stator vanes which are circumferentially spaced apart from each other and extend radially between inner and outer bands to define nozzle assembly 38. The nozzle assembly receives the hot combustion gas 20 from the combustor 14. The airfoils 24 extend radially outwardly from the perimeter of a first supporting disk 40, and are configured as first stage turbine rotor blades which receive the hot combustion gas from the nozzle assembly 38 for extracting energy to rotate the disk 40 during operation.

Figure 2:
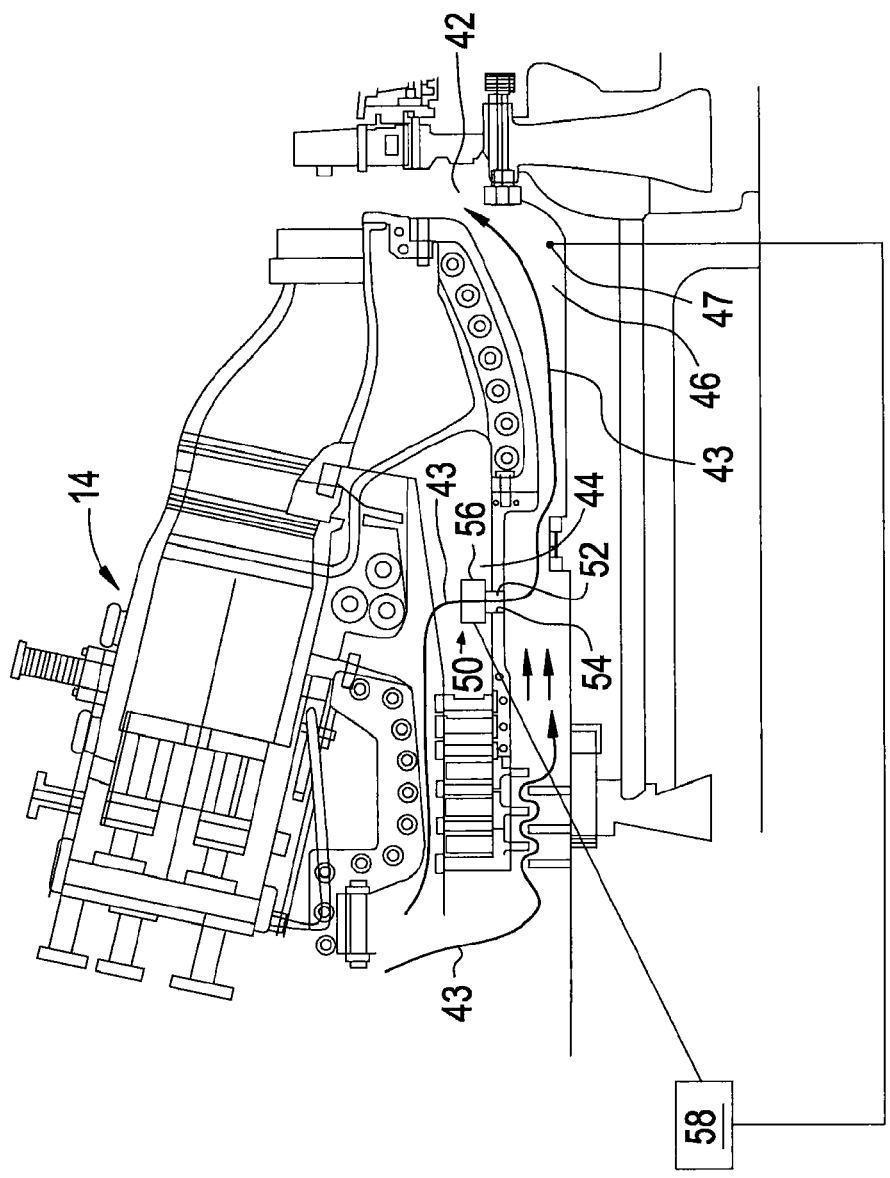
FIG. 2 is an enlarged view of the turbine section of FIG. 1 illustrating features of an exemplary embodiment of the invention.

A wheel space 42 is defined between the nozzle assembly 38 and the compressor exit diffuser 44, proximate the combustor outlet. Due to its proximate location to the outlet of the combustor 14, the wheel space is subject to some of the highest temperatures experienced by the gas turbine engine 10. To maintain the wheel space 42 within a temperature range which is suitable for the long term durability of the components in that region a coolant, such as compressor air 43, FIG. 2, may be supplied from compressor 12, and is delivered to the wheel space 42 through cooling channel 46 which is defined between the compressor exit diffuser 44 and the hub 48.

Under certain operating conditions, such as high ambient temperatures resulting in high temperatures at the inlet of the compressor, the compressor air 43 delivered to the wheel space 42, through cooling channel 46, may be insufficient to maintain the wheel space within a desired temperature range, as determined by wheel space condition sensor 47. The condition sensor 47 may operate to directly determine the temperature in the wheel space 42, but may also sense conditions such as component expansion resulting from temperature excursions therein. A valve assembly 50 is disposed within the compressor exit diffuser 44 and comprises a valve member 52 moveably located in passage 54 of the compressor exit diffuser wall. The valve assembly 50 has a valve actuator 56, such as an electric motor, solenoid or other suitable device for operating the valve member 52. The valve actuator 56 operates in conjunction with valve member 52 to vary the quantity of compressor air passing from the compressor exit diffuser 44 to cooling channel 46, thereby varying the delivery of coolant to the wheel space 42. The valve assembly 50 is actuated by a controller 58, which receives an input signal from the wheel space condition sensor 47. As the wheel space reaches a predetermined condition, such as a defined temperature, the controller 58 signals the valve actuator 56 to move valve member 52 in air passage 54, to admit additional compressor air 43 through passage 54. When the condition is controlled to the desired specification, the controller 58 signals the valve actuator 56 to move the valve member 52 in cooling air passage 50, thereby reducing the flow of compressed air delivered to the wheel space 42 and increasing the overall efficiency of the turbine engine 10. Depending on the type of valve assembly 50 which is selected, the cooling flow through passage 54 may be fixed when the valve member is opened (i.e. on/off—fully open/fully closed), or it may be variable (i.e. partially on/partially off—partially open/partially closed, or modulated).

Figure 3:
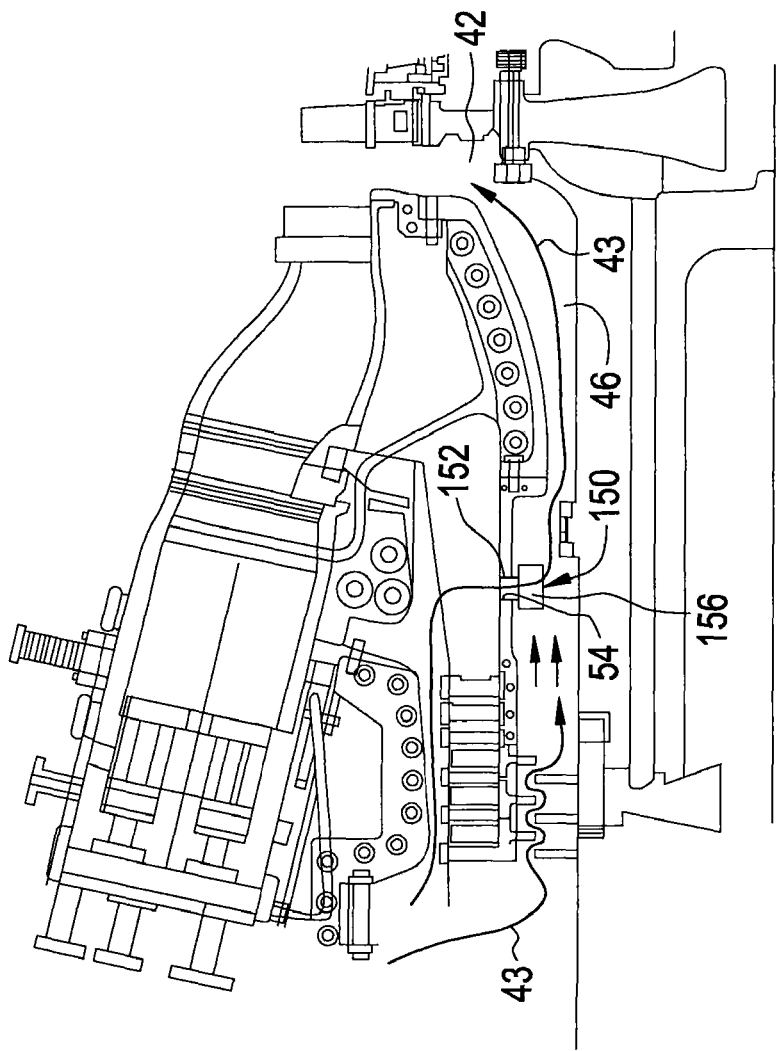
FIG. 3 is an enlarged view of the turbine section of FIG. 1 illustrating features of another embodiment of the invention.

Referring now to FIG. 3, another exemplary embodiment of the invention is shown where like numerals represent like components already described. The valve assembly 150, in this embodiment is a standalone unit operating independently of any external influence such as controller 58 in FIG. 2. The valve assembly 150 may be of the bi-metal or expansion element type which has material properties which are selected to operate the valve member 152 when a predetermined limit has been reached. The expansion of element 156 will occur over a control range as the condition, such as the temperature in passage 46, increases resulting in a variable flow which increases with increasing temperature. As the condition in cooling air passage 46 comes within an acceptable range, the expansion element 156 will retract the valve member 152 thereby reducing the flow of coolant air which is delivered to the wheel space 42. The overall efficiency of the turbine engine 10 is thereby improved.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A cooling system for a turbine engine comprising:
    a cooling passage extending from a cooling fluid source to a wheel space of the turbine engine, the cooling passage defined in part by a compressor exit diffuser; and
    a valve member that is disposed within a wall of the compressor exit diffuser and is in operable communication with the cooling passage and responsive to a condition in the wheel space.

2. The cooling system of claim 1 wherein the cooling system further includes a condition sensor, the valve member being responsive to a signal generated by the condition sensor.

3. The cooling configuration of claim 1 wherein the condition is temperature.

4. The cooling configuration of claim 1 wherein the valve member is of bimetal construction.

5. The cooling configuration of claim 4 wherein the bimetal is responsive to temperature.

6. The cooling configuration of claim 1 wherein the cooling fluid source is compressed fluid from a compressor of the turbine engine.

7. The cooling configuration of claim 1 wherein the valve member further comprises an expansion element having material properties selected to operate the valve member in response to the condition.

8. The cooling configuration of claim 7 wherein the condition is temperature.

9. A method for varying the flow of coolant to a wheel space of a turbine engine comprising:
    sensing a condition in the wheel space, the wheel space in communication with a cooling passage, the cooling passage defined in part by a compressor exit diffuser;
    actuating a valve assembly to operate a valve member to vary the flow of the coolant to the wheel space based on the condition in the wheel space, the valve member being disposed within a wall of the compressor exit diffuser.

10. A method for varying the flow of coolant to a wheel space in a turbine engine as described in claim 9, further comprising:
    creating a signal using a sensor in sensory communication with the wheel space;
    transmitting the signal to a controller;
    comparing the signal to a defined condition; and
    transmitting a signal to the valve assembly to operate the valve member.

* * * * *